United States Patent
Tajima et al.

[11] 3,748,021
[45] July 24, 1973

[54] REVERSE TELEPHOTO LENS FOR NEAR-DISTANCE PHOTOGRAPHY

[75] Inventors: Akira Tajima, Kawasuki; Kikuo Momiyama, Tokyo, both of Japan

[73] Assignee: Canon Kabushiki Kaisha, Tokyo, Japan

[22] Filed: Apr. 5, 1971

[21] Appl. No.: 130,900

[30] Foreign Application Priority Data
Apr. 11, 1970 Japan.............................. 45/30505

[52] U.S. Cl.................. 350/214, 350/176, 350/255
[51] Int. Cl. .............................................. G02b 9/64
[58] Field of Search.................. 350/181, 212, 214, 350/255, 186

[56] References Cited
UNITED STATES PATENTS

| | | | |
|---|---|---|---|
| 2,537,912 | 1/1951 | Reiss | 350/186 |
| 3,517,984 | 6/1970 | Lindstedt et al. | 350/181 |
| 2,956,475 | 10/1960 | Harris et al. | 350/181 |
| 3,473,866 | 10/1969 | Kirchhoff | 350/220 |
| 3,410,632 | 11/1968 | Woltche | 350/214 |
| 3,507,559 | 4/1970 | Mori | 350/214 |
| 3,597,049 | 8/1971 | Ogura | 350/214 |

*Primary Examiner*—John K. Corbin
*Attorney*—Toren & McGeady

[57] ABSTRACT

In the disclosed telephoto lens a front divergent lens group passes light to a rear convergent lens group. The front divergent lens group forms a variable air space in which light from a point on an object on the optical axis travels almost parallel to the optical axis. The air space is varied so that when the lens is focused at a nearby object, the air space is reduced almost proportional to the advanced length of the whole lens. This avoids deterioration of close-up images.

8 Claims, 20 Drawing Figures

Patented July 24, 1973 3,748,021

Spherical Abberation

Astigmatism
Field Curvature

Distortion
Abberation

INVENTORS
AKIRA TAJIMA
KIKUO MOMIYAMA
BY
Toren and McGeady
ATTORNEYS

Spherical Abberation

Astigmatism
Field Curvature

Distortion
Abberation

Spherical Abberation

Astigmatism
Field Curvature

Distortion
Abberation

INVENTORS
AKIRA TAJIMA
BY KIKUO MOMIYAMA

Toren and McGrady
ATTORNEYS

F2.8

-0.02  0  0.02
Spherical Abberation

ω=42°
y=0.882

-0.02  0  0.02
Astigmatism
Field Curvature

ω=42°
y=0.882

-4  0  4%
Distortion
Abberation

Spherical Abberation

Astigmatism Field Curvature

Distortion Abberation

Spherical Abberation

Astigmatism Field Curvature

Distortion Abberation

REVERSE TELEPHOTO LENS FOR NEAR-DISTANCE PHOTOGRAPHY

BACKGROUND OF THE INVENTION

This invention relates to telephoto lenses, and particularly to telephoto lenses which are capable of being used to photograph nearby objects without deterioration of the image.

An advantage of a reverse telephoto type lens resides in its long back-focal length which allows formation of a wide angle lens. On the other hand reverse telephoto lenses have the disadvantage that the image quality at the marginal portions deteriorate when the lens is focused upon closeby objects.

The above deficiency arises mainly from the extreme over-correction for field curvature which the lens exhibits when used for this purpose. This is explained, using third order aberration coefficient, as follows:

let I be the spherical aberration coefficient,
II be the coma aberration coefficient,
III be the astigmatism aberration coefficient,
IV be the saggital image curvature aberration coefficient
V be the distortion aberration coefficient
I* and II* be the iris aberration coefficients, so the aberration coefficient III', IV' at a near distance can be obtained from;

$$III' = III - S(V + II^*) + S^2 I^*$$
$$IV' = IV - S(V + II^*) + S^2 I^*$$

wherein $S$ is a quantity dependent upon the object distance and the nearer the distance is, the larger $S$ is. From the above it is understood that the conditions to remove variation of the near distance aberration are as follows;

$$V + II^* = 0, \quad I^* = 0$$

Although in a reverse telephoto type lens I* is almost zero, V generally positive and II* generally negative, and the absolute value of II* is large as compared with V. Further the sign of S is negative so that III' is smaller than III and IV' is also smaller than IV (III' < III, IV' < IV) in such a manner the image curvature changes to over-correction. The ideal conditions to make V plus II* be equal to zero ($V + II^* = 0$) are that both V and II* are zero ($V = 0, II^* = 0$). However the condition necessary to make II* be equal to zero ($II^* = 0$) is that $\bar{\alpha}$ is equal to $\bar{\alpha}$ ($\bar{\alpha} = \bar{\alpha}'$), where $\alpha$ is the incidence angle of the iris paraxial ray and $\bar{\alpha}'$ the out-going angle of iris paraxial ray. This means that the iris plane coincides with the principal plane. However in case of a reverse telephoto type lens the principal plane is situated behind the iris plane so that $\bar{\alpha}$ is larger than $\bar{\alpha}'$ ($\bar{\alpha} > \bar{\alpha}'$) in such a manner II* can not be made zero ($II^* \neq 0$). Therefore, in an ordinary reverse telephoto lens the image quality off-axis necessarily deteriorates. Moreover, the larger the back-focal length, the greater the deterioration is. Other aberrations are also influenced but very little.

SUMMARY OF THE INVENTION

In order to continue to obtain a good image at the margins even when focusing on close-by objects, some compensation is necessary to under-correct the image plane without adversely affecting spherical, coma, distortion and other aberration. This compensation is possible by changing either the distance of the air space between lenses or the thickness of lenses, and in view of the possibility for continuous adjustment and mechanical construction it is practical to change the distance of the air space between lenses. As to the selection of the air space to be changed, it is desirable to select such an air space that the light flux coming from an object point on the axis runs almost parallel to the optical axis of the lenses, so that such change the distance of the air space has no influence on the spherical aberration and on the focal length. If an air space is changed, so that the light flux is made to diverge or converge, compensation of image curvature is possible. However, the quality of the image in the center deteriorates. This is so because the height of incidence to the lens immediately behind the air space is varied in such a manner that the spherical aberration is influenced.

The lens system according to the present invention is based upon the above mentioned principle, by making the distance of one of the air spaces in the front lens group of a reverse telephoto type lens system consisting of a front divergent lens group variable and of a rear convergent lens group, in which air space the light flux coming from an object point on the axis runs almost parallel to the optical axis of the lens in such a manner that when the whole lens system is advanced to bring an object at near distance into focus. The distance of the air space is shortened almost proportional to the advanced length of the whole lens system so that the deterioration of image at a near distance can be avoided.

The reason why the distance of the above mentioned air space is decreased proportionally to the advanced length of the whole lens system is that the aberration varies linearily, in proportion to the advance length of the whole lens system. Thus the mechanism to advance the whole lens system can also be easily linked with the mechanism to vary the distance of the air space. Further the reduction of the above mentioned distance serves to under-correct the image curvature, and the distance is maximum in photography at an infinite distance. The distance is reduced in accordance with the advance of the whole lens system. This prevents reduction of the illuminance at the marginal portion of the image plane at near distance which is unavoidable with the ordinary wide angle lens. The reason why the air space in which the light flux coming from an object point on the axis runs almost parallel to the optical axis is selected as the variable air space is mentioned as above. Such air space in the front lens group is usually situated immediately after the positive lens in the front lens group. That is the distance $D_8$ immediately after the fourth which is positive in the first embodiment, and the air distance $D_4$ immediately after the second lens which is positive in the second embodiment. Although it is possible to compensate the aberration by varying the distance of an air space in the rear lens group, it is advantageous for the correction of the aberration to make the air space after irisdiaphragm as small as possible, while it is disadvantageous to make it long in advance for the purpose of distance variation, because lateral chromatic aberration is caused to increase. Furthermore, such mechanism as varies a distance between lenses behind irisdiaphragm hinders the various communication mechanism between lenses and the camera body, for example, the mechanism for automatic diaphragm, and especially the larger the diameter of the rear most lens is, the greater the hindrance is.

BRIEF DESCRIPTION OF THE DRAWINGS

The present invention will be described in detail referring to the attached drawings.

DESCRIPTION OF PREFERRED EMBODIMENT

The numerical examples of the embodiment according to the present invention are given below:

R represents radius of curvature of each refraction surface,

D represents thickness of each lens or air distances on the optical axis,

N represents index of refraction of each lens for a ray,

V represents Abbe's number for each lens

Embodiment 1

$f = 1$, F. number $= 4$ $2\omega = 104°$

Back focal length $= 2.0714$ $R_1 = 2.06200$
  $D_1 = 0.11490$  $N_1 = 1.64000$  $V_1 = 60.2$
$R_2 = 1.13510$
  $D_2 = 0.36470$
$R_3 = 2.11260$
  $D_3 = 0.11490$  $N_2 = 1.69680$  $V_2 = 55.2$
$R_4 = 1.04580$
  $D_4 = 0.39700$
$R_5 = 16.31700$
  $D_5 = 0.29770$  $N_3 = 1.68893$  $V_3 = 31.0$
$R_6 = -4.86640$
  $D_6 = 0.00570$
$R_7 = 3.02840$
  $D_7 = 0.27070$  $N_4 = 1.64769$  $V_4 = 33.8$
$R_8 = -46.15600$
  $D_8 = $ variable *
$R_9 = 1.15200$
  $D_9 = 0.05750$  $N_5 = 1.77250$  $V_5 = 49.5$
$R_{10} = 0.49149$
  $D_{10} = 0.15710$
$R_{11} = 1.75700$
  $D_{11} = 0.54280$  $N_6 = 1.50137$  $V_6 = 56.2$
$R_{12} = 0.7380$
  $D_{12} = 0.12640$
$R_{13} = -1.96680$
  $D_{13} = 0.28640$  $N_7 = 1.56384$  $V_7 = 60.7$
$R_{14} = 1.07060$
  $D_{14} = 0.19890$  $N_8 = 1.72151$  $V_8 = 29.2$
$R_{15} = 2.47880$
  $D_{15} = 0.04290$
$R_{16} = -2.54590$
  $D_{16} = 0.05750$  $N_9 = 1.92286$  $V_9 = 20.9$
$R_{17} = 2.47550$
  $D_{17} = 0.25200$  $N_{10} = 1.48749$  $V_{10} = 69.8$
$R_{18} = -0.80556$
  $D_{18} = 0.00570$
$R_{19} = -4.75200$
  $D_{19} = 0.16450$  $N_{11} = 1.77250$  $V_{11} = 49.5$
$R_{20} = -1.16700$

* Variable air distance $= D_8$

| Object distance | ∞ | 17.24 |
|---|---|---|
| $D_8$ | 0.0575 | 0.025 |

Figure 1:
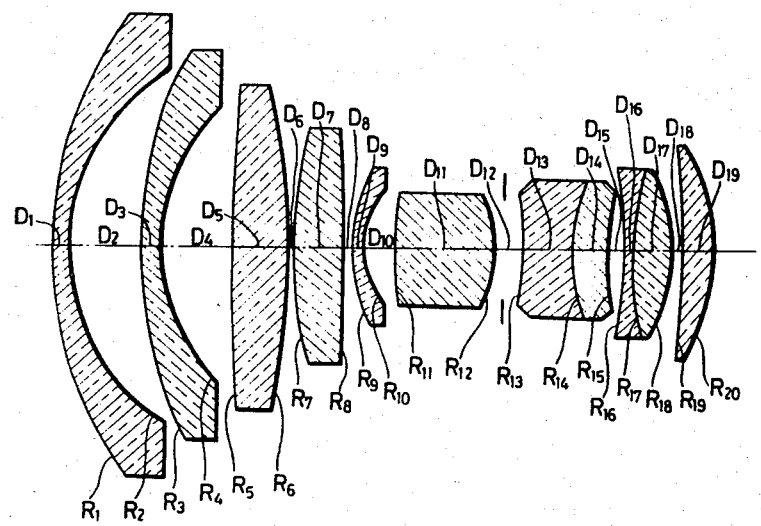
FIG. 1 shows the first embodiment of lens disposition according to the present invention.
Figure 2:
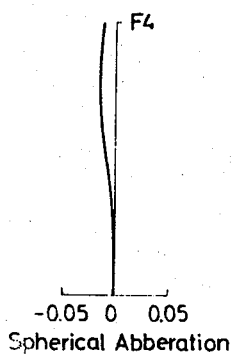
FIG. 2 to 4 respectively shows the aberration of the above mentioned embodiment in photography at an infinite distance.
Figure 3:
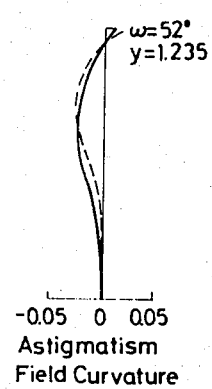
Figure 4:
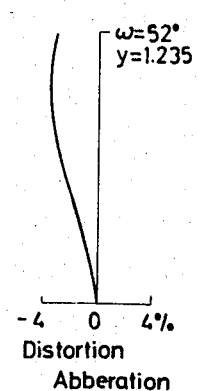
Figure 5:
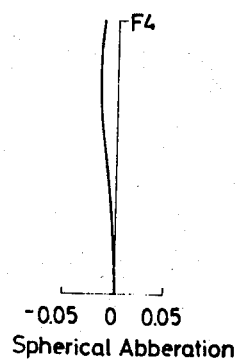
FIG. 5 to 7 respectively shows the aberration of the above mentioned embodiment in case of focusing on the object at a distance 17.24 from the image plane by advancing the whole lens systems as usually.
Figure 6:
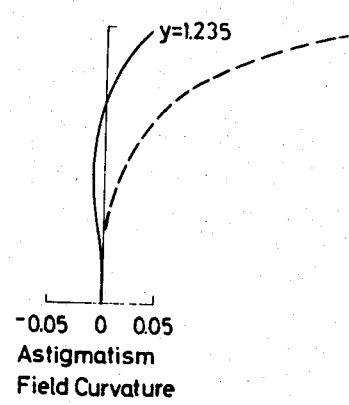
Figure 7:
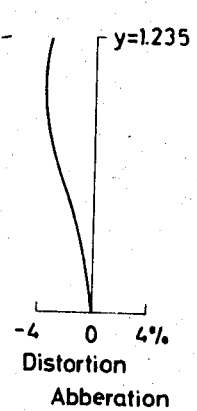
Figure 8:
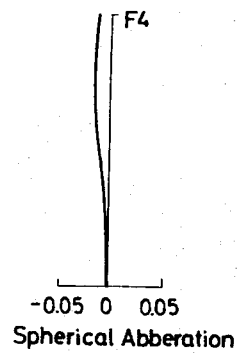
FIG. 8 to 10 respectively shows the aberration of the above mentioned embodiment in case of focusing on the object at a distance 17.24 from the image plane by advancing the whole lens system at the same time changing the distance between lenses according to the present invention.
Figure 9:
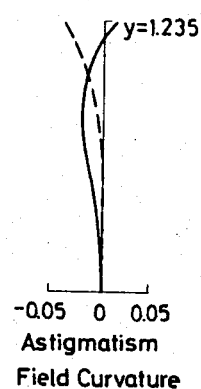
Figure 10:
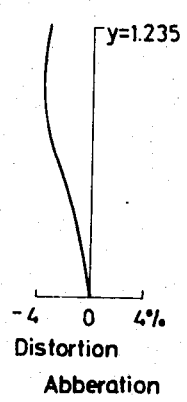
Figure 11:
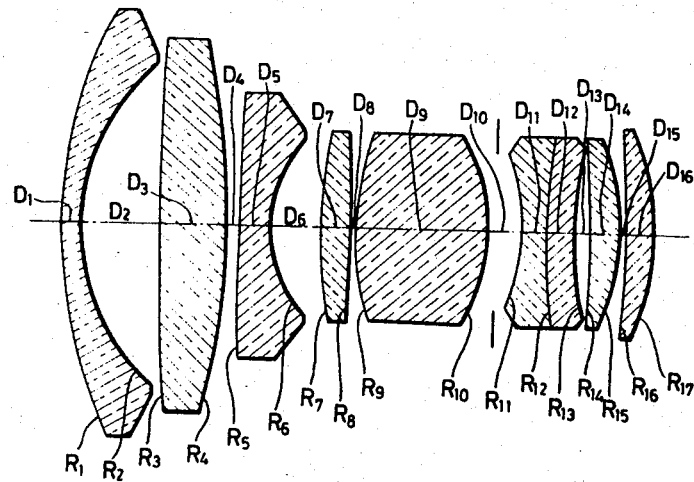
FIG. 11 shows the second embodiment of lens disposition according to the present invention.

FIG. 2 to 4 respectively shows the aberration of the above mentioned embodiment photography at an infinite distance, FIG. 5 to 7 respectively shows the aberration of the above mentioned embodiment when focusing on the object at a distance 17.24 from the image plane, keeping the air distance $D_8$ as it is, whereby it is noticed that the astigmatism and the field curvature are remarkably deteriorated, and FIG. 8 to 10 shows respectively the aberration of above mentioned embodiment when the whole lens system is advanced to obtain a focus at an object distance 17.24, varying the air distance $D_8$ as given in the above table, whereby it is noticed that the astigmatism and field curvature are not deteriorated.

Embodiment 2

$f = 1$ F. number $= 2.8$ $2\omega = 840°$

Back focus length $= 1.4916$ $R_1 = 1.74320$
  $D_1 = 0.08150$  $N_1 = 1.58913$  $V_1 = 61.0$
$R_2 = 0.7914$
  $D_2 = 0.3087$
$R_3 = 17.9249$
  $D_3 = 0.2489$  $N_2 = 1.58913$  $V_2 = 61.0$
$R_4 = -2.8661$
  $D_4 = $ variable *
$R_5 = 7.4418$
  $D_5 = 0.2201$  $N_3 = 1.57957$  $V_3 = 53.7$
$R_6 = 0.4674$
  $D_6 = 0.1857$
$R_7 = 1.8410$
  $D_7 = 0.1142$  $N_4 = 1.80518$  $V_4 = 25.4$
$R_8 = -9.2564$
  $D_8 = 0.0041$
$R_9 = 1.3639$
  $D_9 = 0.5027$  $N_5 = 1.58913$  $V_5 = 61.0$
$R_{10} = -0.7111$
  $D_{10} = 0.1223$
$R_{11} = -0.8777$
  $D_{11} = 0.0979$  $N_6 = 1.80518$  $V_6 = 25.4$
$R_{12} = 2.4012$
  $D_{12} = 0.1019$  $N_7 = 1.72342$  $V_7 = 37.9$
$R_{13} = 1.5432$
  $D_{13} = 0.0489$
$R_{14} = -4.0265$
  $D_{14} = 0.1060$  $N_8 = 1.71300$  $V_8 = 53.9$
$R_{15} = -0.8657$
  $D_{15} = 0.0061$
$R_{16} = -4.2395$
  $D_{16} = 0.1101$  $N_9 = 1.71300$  $V_9 = 53.9$
$R_{17} = -1.0165$

* Variable air distance $D_4$

| Object distance | ∞ | 16.32 |
|---|---|---|
| $D_4$ | 0.065 | 0.004 |

Figure 12:
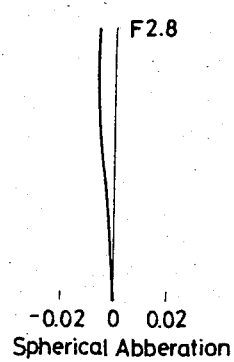
FIG. 12 to 14 respectively shows the aberration of the second embodiment in photography at an infinite distance.
Figure 13:
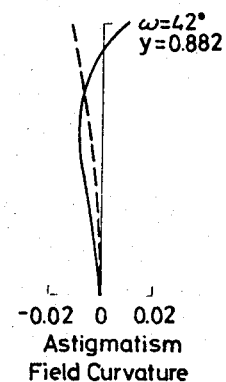
Figure 14:
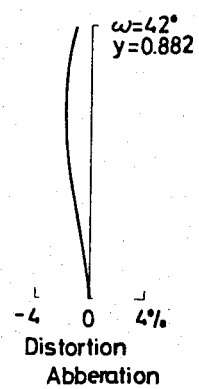
Figure 15:
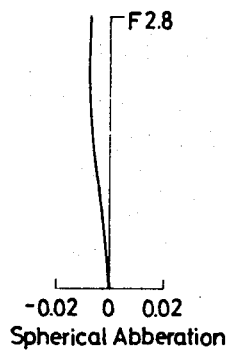
FIG. 15 to 17 respectively shows the aberration of the second embodiment in case of focusing on the object at a distance 16.32 from the image plane by advancing the whole lens system as usually.
Figure 16:
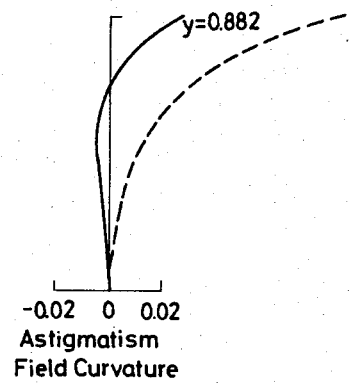
Figure 17:
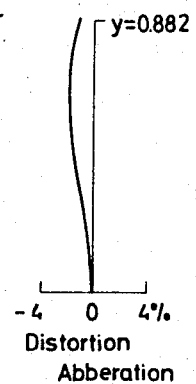
Figure 18:
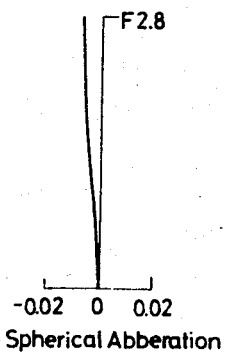
FIG. 18 to 20 respectively shows the aberration of the second embodiment in case of focusing on the object at a distance 16.32 from the image plane at the same time by change the distance between lenses according to the present invention.
Figure 19:
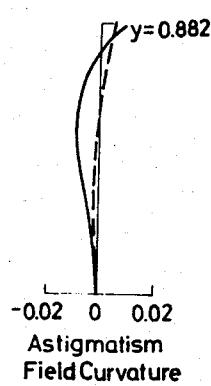
Figure 20:
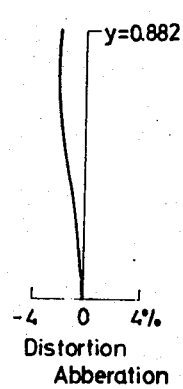

FIG. 12 to 14 respectively shows the aberration of the above mentioned embodiment in photography at an infinite distance, FIG. 15 to 17 respectively shows the aberration of the above mentioned embodiment in case of focusing on the object at a distance 16.32 from the image plane keeping the air distance as it is, whereby it is noticed that the astigmatism and field curvature are remarkably deteriorated, and FIG. 18 to 20 respectively shows the aberration of the above mentioned embodiment in case of focusing on the object at a distance 16.32 from the image plane while the air distance $D_4$ is varied as given in the above table, whereby neither the astigmatism nor the field curvature is deteriorated.

What is claimed is:

1. A lens system, comprising reverse telephoto lens means having a front divergent lens group and a rear convergent lens group, said lens means being focusable by movement of the lens means as a whole, aberration correcting means in said lens means for correcting for aberration over a wide range of focusing positions of said lens means, said aberration correcting means including a plurality of movable elements in the front lens group forming a variable air space and directing light flux from an object along an optical axis of said lens means substantially parallel to the optical axis.

2. A system as in claim 1, said aberration correction means in said lens means correcting for aberration when the lens means is focused on a nearby object.

3. A lens system as in claim 1, wherein when said lens means is focused at a nearby object said movable elements in said aberration correction reduce the air space substantially proportional to the degree to which said lens means is shifted for focusing.

4. A system as in claim 3, said aberration correction means in said lens means correcting for aberration when the lens means is focused on a nearby object.

5. A system as in claim 1, wherein said front divergent lens group includes first negative lens means and positive lens means and second negative lens means arranged in sequence, said positive lens means and said second negative lens means each including one of said movable elements so as to form the variable air space between said positive lens means and said second negative lens means.

6. A system as in claim 5, said aberration correction means in said lens means correcting for aberration when the lens means is focused on a nearby object.

7. A system as in claim 5, wherein when said lens means is focused at the nearby object said movable elements in said aberration correction reduce the air space substantially proportional to the degree to which said lens means is shifted for focusing.

8. A system as in claim 7, said aberration correction means in said lens means correcting for aberration when the lens means is focused on a nearby object.

* * * * *